July 14, 1970    F. E. WILLARD    3,520,332

OPERATOR FOR FLAPPER VALVES

Filed March 4, 1968    2 Sheets-Sheet 1

FRANK E. WILLARD
INVENTOR.

BY

ATTORNEYS

July 14, 1970        F. E. WILLARD        3,520,332

OPERATOR FOR FLAPPER VALVES

Filed March 4, 1968        2 Sheets-Sheet 2

FRANK E. WILLARD
INVENTOR.

BY

ATTORNEYS

United States Patent Office 3,520,332
Patented July 14, 1970

3,520,332
OPERATOR FOR FLAPPER VALVES
Frank E. Willard, Dallas, Tex., assignor to Cook
Machinery Co., Inc., Dallas, Tex.
Filed Mar. 4, 1968, Ser. No. 709,979
Int. Cl. F16k *31/04*
U.S. Cl. 137—624.13                                5 Claims

ABSTRACT OF THE DISCLOSURE

The valve operator disclosed has a disc that is a combination crank and cam. The disc is rotated by a shaft and like a crank reciprocates a valve operating rod to open and close a flapper valve. The periphery of the disc is contoured to serve as a cam. Two switches, one actuated by a timer and the other by the cam surface of the disc, control the supply of power that rotates the disc to open and close the valve.

---

This invention relates to valve operators generally, and in particular to valve operators for flapper valves that are opened and closed by an axially reciprocating operating rod.

Flapper valves are often used as dump valves. For example, in laundry machines flapper valves are used to drain the tubs of wash water. Flapper valves are preferred for this service because they offer large flow passages through which the water can drain with little restriction to its flow.

When opening or closing any valve, it is advantageous to do so quickly. This reduces the erosion of the valve element and the valve seat by the high velocity fluid passing between these two members as the valve opens or closes under pressure. Operators can be arranged to accomplish this; however, in many cases, it will be necessary for the flapper valve to remain open for a given period of time. For example, if it is used as a drain valve, time will be required for the liquid in the tub or vessel being drained to flow through the drain valve and empty the vessel.

Therefore, it is an object of this invention to provide a valve operator for a flapper valve that will open the valve quickly, hold it open for a given period of time, and then close it quickly.

It is another object of this invention to provide a valve operator for flapper valves that is of simple construction and which returns the valve to approximately the same position after each cycle of operation.

It is yet another object of this invention to provide a motor operated flapper valve that includes a crank member that is rotated in the same direction to open and close the valve, and a valve operating rod that is provided with a lost motion connection between the crank and the valve member to permit the crank to reach either its top dead center or its bottom dead center, as the case may be, even though lint or trash caught between the valve element and the valve seat prevents the valve from closing completely.

It is yet another object of this invention to provide a valve operator for a flapper valve having a crank that reciprocates the valve operating rod to open and close the valve which employs crank position to control the operation of the operator.

These and other advantages, features, and objects of the invention will be apparent to those skilled in the art from a consideration of this specification, including the appended claims and attached drawings.

The invention will now be described in detail in connection with the attached drawings in which.

Figure 1:
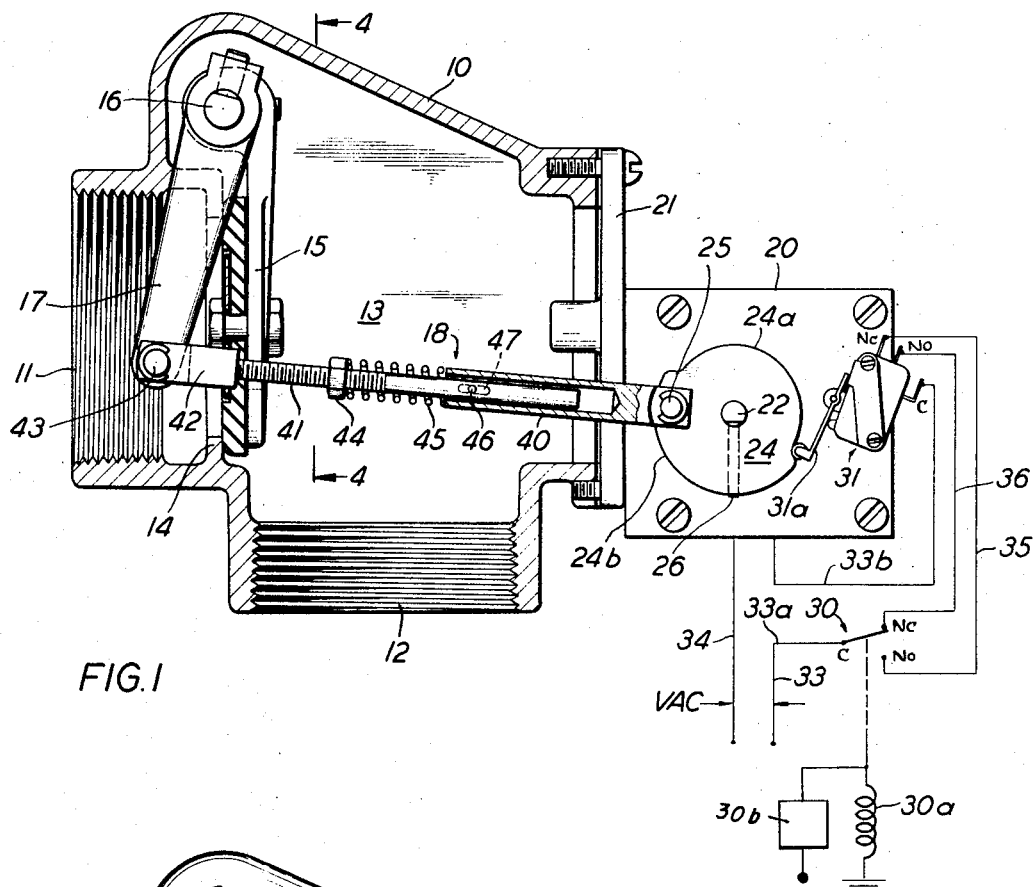
FIG. 1 is a view partially in vertical section and partially in side elevation of the preferred embodiment of the motor operated flapper valve of this invention with the valve closed.
Figure 2:
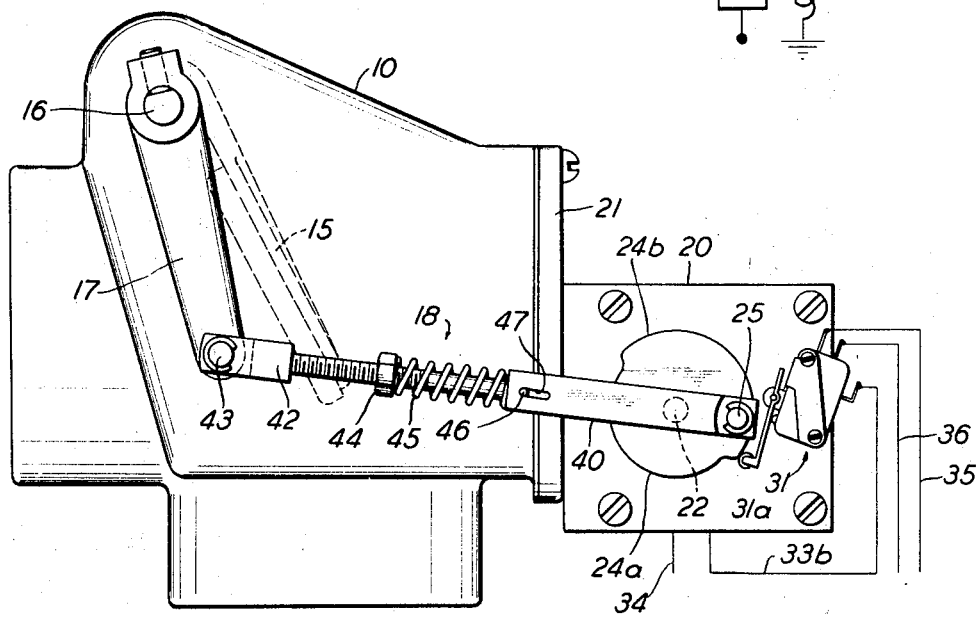
FIG. 2 is a side view in elevation of the valve of FIG. 1 with the valve open.
Figure 3:
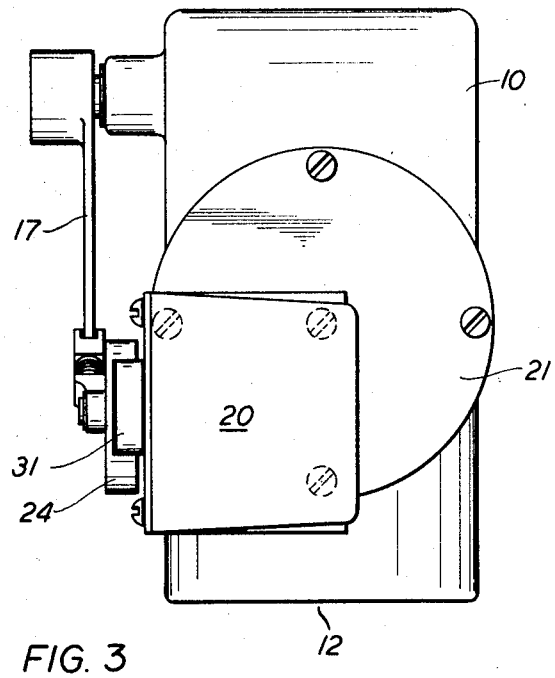
FIG. 3 is an end view of the motor operated flapper valve of FIGS. 1 and 2.
Figure 4:
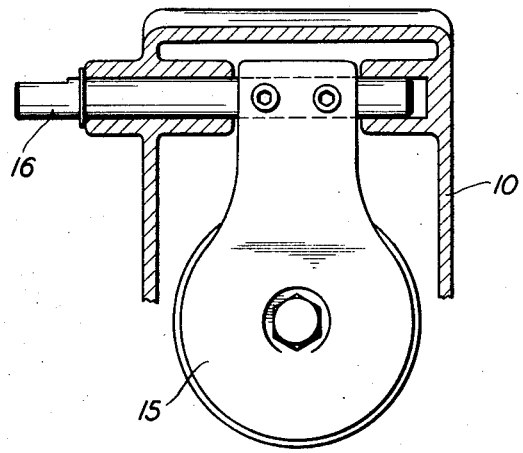
FIG. 4 is a partial sectional view taken along line 4—4 of FIG. 1.

The flapper valve includes hollow body 10 with inlet 11 and outlet 12. Flow passageway 13 connects the inlet and outlet. Fluid flowing into inlet 11 passes through valve seat 14, which is engaged when the valve is closed by valve element 15. Shaft 16 is rotatably mounted in the side walls of body 10 and supports valve element 15 for movement into and out of engagement with valve seat 14. Rotating shaft 16 in a clockwise direction, as viewed in FIG. 1, moves the valve element into engagement with the valve seat. Rotation of shaft 16 in the opposite or counterclockwise direction moves the valve element away from the valve seat, as shown in FIG. 2, and opens the valve.

Shift 16 extends to the outside of valve body 10 for connection to the means for rotating it in opposite directions to open and close the valve. Arm 17 has one end mounted on this protruding portion of the shaft. The other end of arm 17 is connected to valve operating rod 18. The operating rod and arm 17 are pivotally connected together so that reciprocation of rod 18 will cause arm 17 to oscillate, rotate shaft 16, and open and close the valve.

The operator for reciprocating rod 18 includes a power means and a crank. In the embodiment shown, gear motor 20 is mounted on end plate 21 of body 10 and disc 24 is mounted on output shaft 22 of the gear motor. The end of operating rod 18 is pivotally connected to disc 24 by pin 25. Thus, the disc and rod rotate relative to each other around the axis of pin 25, which is parallel to and spaced from the axis of rotation of shaft 22. Set screw 26 insures the disc 24 will rotate with the output shaft of the motor. The rotation of disc 24 will move operating rod 18 axially to the right and open the valve, when the disc has rotated one-half of a revolution from the position shown in FIG. 1. Continued rotation of the disc will cause the rod to move back to the left and return the valve element to its closed position upon the completion of one revolution of the disc.

Means are provided for actuating the power means, gear motor 20, to rotate shaft 22 and disc 24. In the embodiment shown, switch 30 and cam operated switch 31 are connected in series in line 33, which combines with line 34 to provide power to gear motor 20. The two switches are connected with the normally closed contact of one connected to the normally open contact of the other. The common of both switches are connected in series by portions 33a and 33b of line 33.

Switch 30 is normally closed and switch 31 is normally open. To actuate the power means, coil 30a is energized moving switch 30 from its first or normally closed position to its second or normally open position. This connects lead 33 to motor 20 through line 35, which connects the normally open contact of switch 30, with the normally closed contact of switch 31. The motor will then rotate shaft 22 in a clockwise direction, as viewed in FIG. 1.

Cam means are provided to de-actuate the power means and stop the rotation of the output shaft of the motor after the shaft and crank have rotated through a given angle of rotation. In the embodiment shown, the periphery of disc 24 is contoured to provide such cam means. The periphery has portion 24a which is of lesser diameter than portion 24b. When the valve is closed, as shown in FIG. 1, and disc 24 is at top dead center relative to rod 18, actuator 31a of switch 31 is riding on surface 24a. In this position switch 31 is in its normally closed condition and when switch 30 is moved to its second or normally open position, power will be supplied to motor 20.

Motor 20 will then rotate disc 24 clockwise until actuator 31a moves onto surface 24b. This will cause the actuator to move switch 31 from its first or normally closed position to its second or normally open position. This will interrupt the flow of power through lead 33 and the motor will stop. At this time, the disc is at bottom dead center and the valve is open, as shown in FIG. 2.

The valve will stay open until switch 30 is returned to its first or normally closed position. Various means can be provided to hold the switch in its second position for a pre-selected time. A timer, as for example timing circuit 30b, indicated schematically in FIG. 1, can be used to de-activate coil 30a after the desired length of time has passed. After the pre-selected length of time has passed, coil 30a is de-energized allowing switch 30 to return to its first or normally closed position. Motor 20 is now supplied with power from line 33 through line 36 that connects the normally closed contact of switch 30 and the normally open contact of switch 31, which is now in its second or normally open position due to the position of actuator 31a.

Supplied with power, motor 20 will rotate disc 34 clockwise until switch actuator 31a drops off of raised portion 24b on the periphery of the disc. This moves switch 31 from its second or normally opened position back to its first or normally closed position. This will also interrupt the flow of power to the motor and the rotation of disc 24 will stop with the valve closed. The operator could be arranged to begin with the valve open and end its cycle with it open, if desired.

Since crank or disc 24 rotates in one direction between the top dead center position of FIG. 1 and the bottom dead center position of FIG. 2 and back again, should lint or other debris be caught between valve element 15 and valve seat 14, the valve could be prevented from closing. This would stop disc 24 before it completed its rotation and the operator would not be in condition for another cycle of operation. To prevent this, valve operating rod 18 is an assembly which includes a lost motion connection. The operating rod assembly comprises sleeve 40, which has one end connected to disc 24 by pin 25. Threaded rod 41 has one end extending into sleeve 40 and the other end rotatably connected to arm 17 by connector 42 and pin 43. Adjusting nut 44 or rod 41 compresses spring 45 between the nut and the end of sleeve 40. Pin 46 extends through sleeve 18 and elongated slot 47 in rod 41. This allows relative axial movement between the sleeve and the rod, which movement is resisted in one direction by coil spring 45. The amount of resistance exerted by coil spring 45 can be adjusted by moving nut 44 on rod 41. With this arrangement, should valve element 15 be prevented from closing completely because of lint or debris between it and valve seat 14, spring 45 will compress further and allow the operator to complete its cycle.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An operator for a flapper valve that is opened and closed by reciprocating an operating rod axially, comprising a drive shaft, a crank mounted on the shaft for connection to such a valve operating rod to reciprocate the rod axially in one direction during one half of each revolution of the crank and in the other direction during the other half of each revolution, power means for rotating the shaft to rotate the crank, means for actuating the power means to rotate the shaft and crank and move the actuating rod axially, having a cam means mounted on the drive shaft to de-actuate the power means and stop the rotation of the shaft after the shaft and crank have rotated through a given angle of rotation, means for again actuating the power means after a preselected period of time to rotate the shaft until said cam means again de-actuates the power means when the shaft has completed one revolution and the actuating rod has returned the valve to its original condition, said cam means and the crank comprising a disc mounted on the shaft to rotate therewith having a periphery contoured to de-actuate the power means when the shaft and disc have rotated through said given angle of rotation and when the shaft has completed one revolution.

2. The operator of claim 1 further provided with means for actuating the power means including a first switch having an actuator in engagement with the contoured periphery of the disk to move the switch from a first position to a second position to de-actuate the power means when the disc has moved through said given angle of rotation and to return the switch to its first position and again de-actuate the power means when said cam is rotated one revolution.

3. The operator of claim 2 in which the means for actuating the power means also includes a second switch movable from a first to a second position to actuate the power means when said cam actuated first switch is in its first position, timer means for holding said switch in said second position for a preselected period of time after the power means has been de-actuated by the movement of the cam actuated first switch to its second position by the contoured surface of the disc, and means for returning the second switch to its first position to again actuate the power means to rotate the disc until its contoured periphery returns the cam actuated first switch to its first position and de-actuates the power means when the disc has completed one revolution and the valve operating rod has been returned to its original position.

4. A motor operated flapper valve, comprising a valve body with a fluid passageway and a valve seat, a valve element mounted in the passageway on a shaft that is rotatably supported by the body and extends outwardly thereof, said valve element being movable away from the valve seat to open the valve by rotation of the shaft in one direction and toward the seat to close the valve by rotation of the shaft in the opposite direction, an arm with one end attached to the shaft, a drive motor with an output shaft, an actuating cam disc mounted on the output shaft for rotation with the shaft, a valve operating rod with one end pivotally connected to the end of the arm opposite the end attached to the shaft and the other end pivotally connected to the cam disc to rotate around an axis offset from the axis of rotation of the cam so that during one half of each revolution of the output shaft the cam disc will move the rod axially in one direction and through the arm rotate the shaft in the first direction to open the valve and during the other half of the revolution move the rod axially in the other direction and through the arm rotate the shaft in the other direction and close the valve, and motor control means including a control switch having an actuator for moving the switch between a first and second position, said actuator being engaged by the periphery of the cam disc, said periphery having a contour such that the actuator holds the switch in a first position during the first half of each revolution and in the second position during the second half of each revolution, a second switch having a first and second position connected in series with said cam switch and the motor to connect the motor to a source of power when moved to its second position and the cam swtich is in its first position to cause the motor to rotate the cam disc one half a revolution to open the valve and to move the cam actuated switch to its second position stopping the flow of electricity to the motor, timer means to hold the second switch in its second position a preselected period of time after which the switch is moved to its first position again supplying power to the motor through the cam switch in its second position to cause the motor to rotate the cam disc another one half of a revolution, close the valve, and cam the switch actuator of the cam operated switch to move the switch to its first position stopping the flow of power to the motor.

5. The flapper valve of claim 4 in which the valve operating rod includes a sleeve and a rod and a resilient means for transmitting axial force between the sleeve and rod in one direction to permit the cam disc to be rotated through one complete revolution even though debris prevents the valve from closing completely.

References Cited

UNITED STATES PATENTS

| | | | |
|---|---|---|---|
| Re. 24,663 | 6/1959 | Markley | 251—134 |
| 1,989,942 | 2/1935 | Parks et al. | 251—134 |
| 3,165,291 | 1/1965 | Osen | 251—134 |
| 3,212,579 | 10/1965 | Cryer | 251—134 XR |

FOREIGN PATENTS

| | | |
|---|---|---|
| 119,399 | 10/1930 | Austria. |
| 68,699 | 6/1958 | France. |
| 164,924 | 10/1933 | Switzerland. |

ROBERT G. NILSON, Primary Examiner

U.S. Cl. X.R.

251—134